(12) United States Patent
Mohr

(10) Patent No.: US 7,559,723 B2
(45) Date of Patent: Jul. 14, 2009

(54) HULL-TO-CAISSON INTERFACE CONNECTION ASSEMBLY FOR SPAR PLATFORM

(75) Inventor: Harvey O. Mohr, Fredericksburg, TX (US)

(73) Assignee: Technip France, Courbevoie (FR)

( * ) Notice: Subject to any disclaimer, the term of this patent is extended or adjusted under 35 U.S.C. 154(b) by 183 days.

(21) Appl. No.: 11/361,132

(22) Filed: Feb. 24, 2006

(65) Prior Publication Data

US 2007/0201955 A1 Aug. 30, 2007

(51) Int. Cl.
B63B 35/44 (2006.01)

(52) U.S. Cl. .................. 405/195.1; 405/211; 405/224.3; 403/41; 403/112; 403/404; 166/350

(58) Field of Classification Search .............. 405/195.1, 405/214, 215, 224.3; 285/18, 123.1, 321; 166/344, 345, 355; 403/41, 111, 112, 132, 403/133, 404, 409.1
See application file for complete search history.

(56) References Cited

U.S. PATENT DOCUMENTS

| | | | |
|---|---|---|---|
| 2,069,270 A * | 2/1937 | Piron ...................... | 267/140.5 |
| 2,126,707 A * | 8/1938 | Schmidt .................. | 267/140.5 |
| 2,553,636 A * | 5/1951 | Dath ......................... | 213/45 |
| 3,071,422 A * | 1/1963 | Hinks ....................... | 384/221 |
| 3,941,433 A * | 3/1976 | Dolling et al. ............. | 384/129 |
| 3,944,376 A * | 3/1976 | Hata ......................... | 403/132 |
| 4,105,266 A * | 8/1978 | Finney ...................... | 384/221 |
| 4,199,847 A   | 4/1980 | Owens | |
| 4,324,194 A * | 4/1982 | Elliston ................... | 114/264 |
| RE31,635 E  * | 7/1984 | Smith et al. .............. | 403/144 |
| 4,470,723 A * | 9/1984 | Michel et al. ............. | 405/202 |
| 4,708,514 A * | 11/1987 | Walter et al. ............. | 403/372 |
| 4,784,529 A * | 11/1988 | Hunter ..................... | 405/227 |
| 4,844,659 A * | 7/1989 | Hunter et al. ............. | 405/224 |
| 4,856,827 A   | 8/1989 | Delamare | |
| 4,892,444 A * | 1/1990 | Moore ..................... | 405/195.1 |
| 4,907,914 A * | 3/1990 | Gunderson et al. ......... | 405/224 |

(Continued)

OTHER PUBLICATIONS

International Search Report on corresponding PCT application (PCT/US2007/062505) from International Searching Authority (EPO) dated Aug. 16, 2007.

(Continued)

Primary Examiner—Tara Mayo-Pinnock
(74) Attorney, Agent, or Firm—Klein, O'Neill & Singh, LLP

(57) ABSTRACT

A hull-to-caisson interface connection assembly accommodates high tension loads between the hull and a caisson of a Spar-type platform, while facilitating angular flexing motion and constraining lateral and axial movement. The interface connection assembly includes an annular bearing shoulder at the top end of caisson, and a laminated bearing assembly mounted in the bottom of the hull and defining a passage through which the upper portion of the caisson passes, so that the caisson shoulder seats against the upper end of the bearing assembly. The bearing assembly includes a laminated structure of alternating steel and elastomeric flex elements, bonded to each other to flex together as a unit, rather than sliding relative to each other. The laminated structure of the bearing assembly supports the vertical tensile loads applied by the weight of the caisson on the hull, while also accommodating the angular loads applied between the caisson and the hull.

5 Claims, 4 Drawing Sheets

U.S. PATENT DOCUMENTS

| | | | |
|---|---|---|---|
| 4,929,115 A * | 5/1990 | Lunke et al. | 403/228 |
| 5,286,132 A * | 2/1994 | Morini | 403/228 |
| 5,299,790 A * | 4/1994 | Whightsil, Sr. | 267/292 |
| 5,427,180 A * | 6/1995 | dePaiva Leite et al. | 166/355 |
| 5,437,518 A * | 8/1995 | Maloberti et al. | 405/169 |
| 5,482,406 A * | 1/1996 | Arlt, III | 405/195.1 |
| 5,628,586 A * | 5/1997 | Arlt, III | 405/195.1 |
| 5,639,187 A * | 6/1997 | Mungall et al. | 405/195.1 |
| 5,641,248 A * | 6/1997 | Arlt, III | 405/195.1 |
| 5,658,095 A * | 8/1997 | Arlt et al. | 405/195.1 |
| 5,704,726 A * | 1/1998 | Nemoto | 403/133 |
| 5,873,678 A * | 2/1999 | Moses | 405/223.1 |
| 6,120,871 A * | 9/2000 | De Biase | 428/68 |
| 6,267,341 B1 * | 7/2001 | Fleming et al. | 248/309.4 |
| 6,413,003 B1 * | 7/2002 | Schmidt et al. | 403/120 |
| 6,431,284 B1 * | 8/2002 | Finn et al. | 166/350 |
| 6,454,484 B1 * | 9/2002 | Parker et al. | 403/132 |
| 6,524,152 B1 * | 2/2003 | Dauphin et al. | 441/133 |
| 6,558,084 B2 | 5/2003 | Moog et al. | |
| 6,582,148 B1 * | 6/2003 | Walter et al. | 403/220 |
| 6,726,394 B2 * | 4/2004 | Garnier et al. | 403/135 |
| 6,824,323 B2 * | 11/2004 | Garnier et al. | 403/135 |
| 6,854,933 B2 | 2/2005 | Horton, III | |
| 6,896,062 B2 | 5/2005 | Davies et al. | |
| 6,945,737 B1 | 9/2005 | Xu | |
| 6,953,187 B2 * | 10/2005 | Groth et al. | 267/141 |
| 6,953,308 B1 | 10/2005 | Horton | |
| 7,165,909 B2 * | 1/2007 | Buhl et al. | 403/132 |
| 2003/0019625 A1 | 1/2003 | Moog | |
| 2006/0177276 A1 * | 8/2006 | Stassen et al. | 405/224.3 |

OTHER PUBLICATIONS

Written Opinion on corresponding PCT application (PCT/US2007/062505) from International Searching Authority (EPO) dated Aug. 16, 2007.

* cited by examiner

US 7,559,723 B2

HULL-TO-CAISSON INTERFACE CONNECTION ASSEMBLY FOR SPAR PLATFORM

CROSS-REFERENCE TO RELATED APPLICATION

Not Applicable

FEDERALLY SPONSORED RESEARCH OR DEVELOPMENT

Not Applicable

BACKGROUND OF THE INVENTION

This invention relates to floating offshore storage, drilling or production platforms and more particularly, platforms of the Spar type. More specifically, the invention relates to an improved interface connection assembly between the Spar hull and a caisson extending downwardly therefrom.

Floating platforms are typically employed in water depths of about 500 ft. (approximately 152 m) and greater, and are held in position over a seabed well site by mooring lines anchored to the sea floor, or by motorized thrusters located on the sides of the platform, or both. Although floating platforms are more complex to operate because of their movement in response to wind and water conditions, they are capable of operating in substantially greater water depths than are fixed platforms, and are also more mobile, and hence, easier to move to other well sites. There are several different types of known floating platforms, including so-called "drill ships," tension-leg platforms ("TLPs"), "semi-submersibles," and "Spar" platforms.

Spar-type platforms comprise an elongate, substantially cylindrical (or multi-cylindrical) buoyant hull that supports one or more decks above the surface of the water when floating in an upright operating position, in which an upper portion of the platform hull extends above the waterline and a lower portion is submerged below it. Because part of the platform hull is above the water, it is subject to forces of wind, waves, and water currents which cause a constant movement of the platform. Generally, a Spar-type floating platform is designed to be installed for a 25 to 30 year service life.

Despite their relative success, Spar-type platforms include some aspects that need improvement to accommodate various applications and/or a larger spectrum of environmental conditions. For example, in typical Spar designs and configurations, at least one tubular caisson extends downwardly from the bottom of the Spar hull. The caisson(s) may extend some distance below the Spar, or to the sea floor. Often the inside of the caisson will include a plurality of tubulars and/or control bundles. Because the caisson extends below the floating spar hull, there is typically relative, flexing motion at the interface connection area between the Spar hull and the caisson. Currently existing hull-to-caisson interface connections do not accommodate very high tensile loads, the bending/flexing relative motion between the spar hull and the caisson for the life of the installation, and the very demanding fatigue life. Since the wind, waves, and water currents are always present in various intensities, the hull/caisson interface connection must be designed to accommodate the very demanding fatigue life due to the high loads and constant relative motion.

It would therefore be desirable for an improved Spar hull-to-caisson interface connection that accommodates high tension loads between the spar hull and the caisson while still facilitating angular, flexing motion (rotation) while also simultaneously constraining lateral movement and vertical axial movement. The result would be highly-improved fatigue characteristics of the interface between the Spar hull and the caisson.

SUMMARY OF THE INVENTION

In accordance with the present invention, a Spar hull-to-caisson interface connection assembly is provided that accommodates high tension loads between the hull and caisson of a Spar-type platform, while facilitating angular, flexing motion (rotation) and simultaneously constraining lateral movement and vertical axial movement. Broadly, the interface connection assembly comprises an annular bearing shoulder provided at the top end of caisson, and a laminated bearing assembly mounted in the bottom end of the hull and defining a passage through which the upper portion of the caisson passes, so that the caisson shoulder seats against the upper end of the bearing assembly. The bearing assembly comprises a laminated structure of alternating steel and elastomer flex elements that are bonded to each other so that they flex together as a unit, rather than sliding relative to each other. The laminated structure of the bearing assembly supports the vertical tensile loads applied by the weight of the caisson on the hull, while also allowing a smooth and efficient accommodation of the angular and rotational loads applied between the caisson and the hull, so as to reduce fatigue at the hull/caisson interface.

A more complete understanding of the invention can be obtained by reference to the following detailed description of the preferred embodiments thereof in connection with the attached drawings.

DETAILED DESCRIPTION OF THE INVENTION

Figure 1:
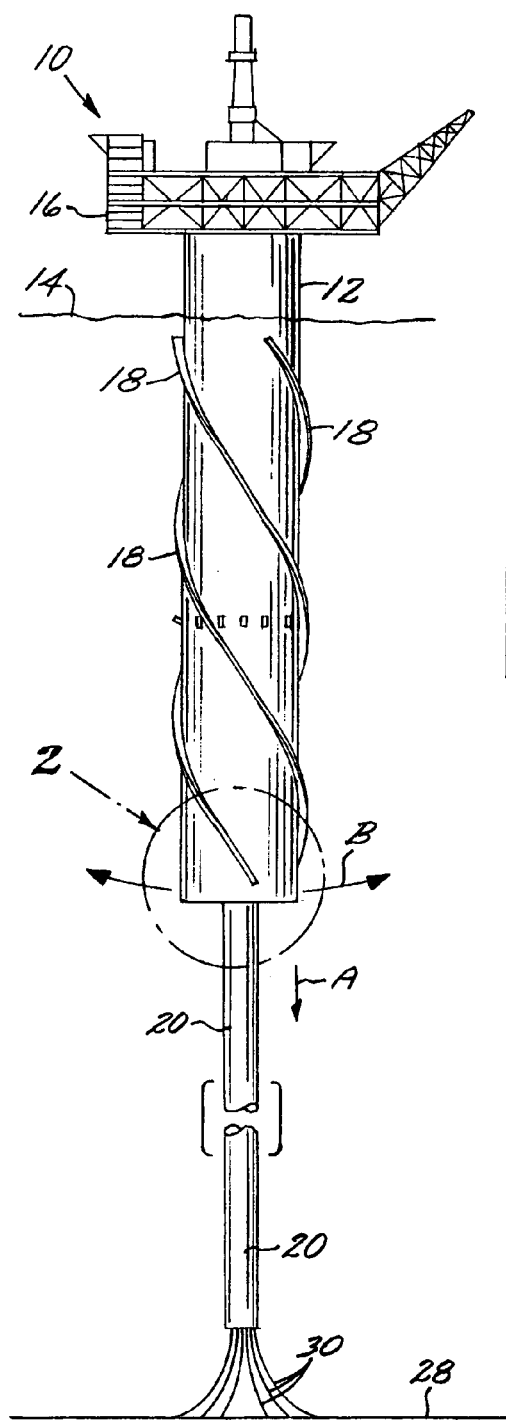
FIG. 1 is an elevational view of a Spar-type platform, of a type that may incorporate a hull/caisson interface connection in accordance with the present invention.
Figure 2:
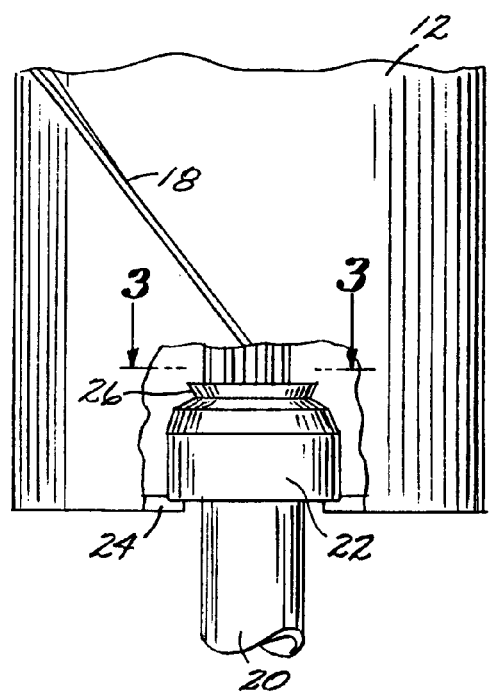
FIG. 2 is an elevational view of the portion of FIG. 1 enclosed within the dashed outline 2 in FIG. 1, partially broken away to show a Spar hull/caisson interface connection assembly in accordance with a first preferred embodiment if the present invention.
Figure 3:
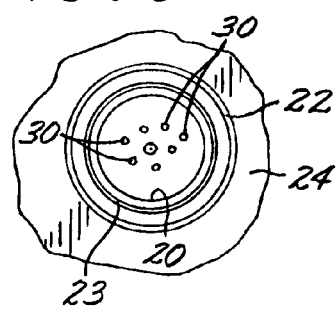
FIG. 3 is a cross-sectional view taken along line 3-3 of FIG. 2.

Referring first to FIGS. 1-3, an elevational view of a Spar-type offshore oil and gas drilling and production platform 10 is illustrated in FIG. 1, in which the platform 10 is shown floating upright in a deep body of water. The platform 10 comprises a hull 12, a substantial portion of which is submerged below the surface 14 of the body of water. The hull 12 extends above the surface 14 of the water to support a deck 16 that carries drilling and production equipment, crew living quarters, etc., as is conventional. Fixed or variable ballast elements (not illustrated) may be disposed within the submerged portion of the hull 12 to lower the center of gravity of the platform 10 substantially below its center of buoyancy, thereby enhancing the stability of the platform 10 by increasing its natural period above the period of waves in the body of water. The hull 12 advantageously includes one or more helical strakes 18 that extend radially outwardly from the hull 12, and that are arranged so as to define at least one generally helical band extending around the periphery of the submerged portion of the hull 12. The purpose of the helical strake or strakes 18 is to prevent or minimize vortex-induced vibrations, as is well-known in the art.

The platform 10 further comprises at least one cylindrical caisson 20 that extends vertically down from the hull 12. The caisson 20 is coupled to the hull 12 by means of an interface bearing assembly 22 (FIG. 2), in accordance with the present invention. The bearing assembly 22, which will be described in detail below, is seated in an annular receptacle 24 mounted in the open bottom end of the hull 12, as shown in FIG. 2. The bearing assembly 22 defines a central passage 23 (see FIGS. 4 and 5) through which the upper portion of the caisson 20 passes as it enters the bottom of the hull 12 through a central opening 25 in the receptacle 24 (see FIG. 4), so that the bearing assembly 22 is disposed coaxially around the upper portion of the caisson 20. As will be discussed below, the diameter of the passage 23 increases from the upper end of the bearing assembly 22 to the lower end thereof. The caisson 20 may advantageously include a flared rim 26 around its upper end. The weight of the caisson 20 applies a vertical tensile load (indicated by arrow "A" in FIG. 1) on the hull 12, while wind, waves, and currents apply angular flexing loads (indicated by arrow "B" in FIG. 1) between the hull 12 and the caisson 20.

Drilling, production, and export from the platform 10 all require vertical conduits through the water column between the seabed 28 and the platform 10. These conduits are typically provided by a plurality of risers 30 that extend from the seabed 28, upwardly through the caisson 20 and the hull 12 to the deck 16. In a typical Spar-type platform, the risers 30 may be secured to the deck 16 by tensioning devices (not shown), or they may be supported on the deck and descend therefrom in a modified catenary shape to the seabed 28. Other means, well-known in the art, may be employed to support individual risers, especially those of a smaller diameter.

Figure 4:
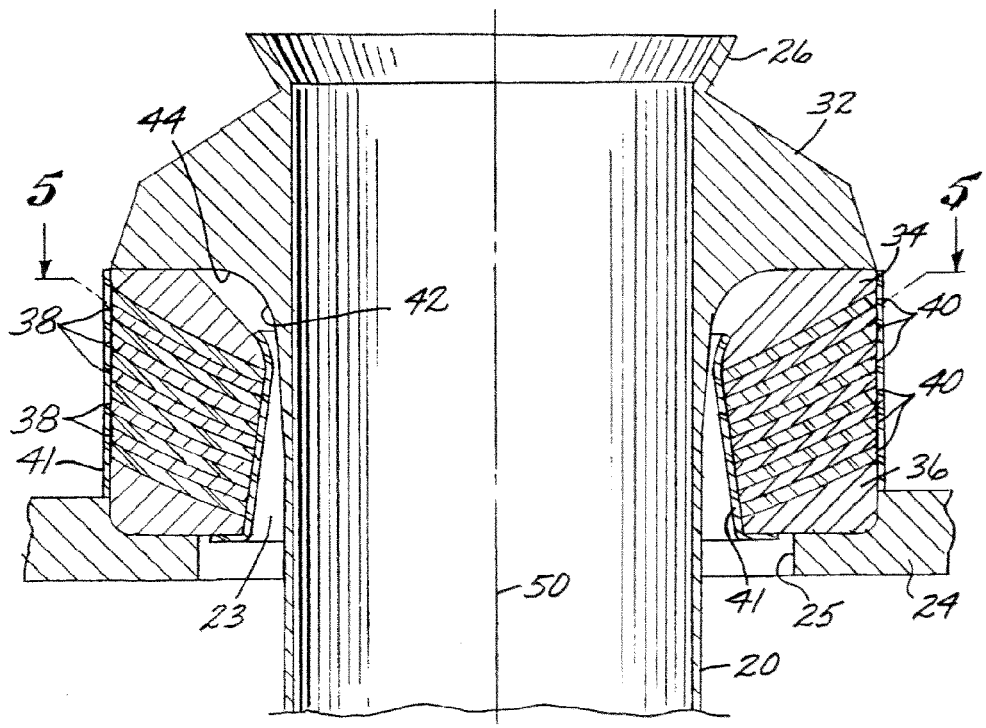
FIG. 4 is a longitudinal cross-section view of a hull/caisson interface connection assembly according to the first preferred embodiment of the present invention.

Turning now to FIG. 4, the interface connection assembly in accordance with a first preferred embodiment of the present invention includes an annular shoulder 32 extending radially outward from the top end of the caisson 20. The bearing assembly 22 coaxially surrounds the upper portion of the caisson 20 just below the shoulder 32. The uppermost part of the bearing assembly 22 is a steel top bearing ring 34, disposed so that the bottom surface of the shoulder 32 rests on top of the top bearing ring 34. The lowermost part of the bearing assembly 22 is a steel bottom support ring 36 that is seated in the receptacle 24 in the bottom end of the hull 12, as described above. Arranged between the top bearing ring 34 and the bottom support ring 36 of the bearing assembly 22 is a plurality of flex elements, comprising a plurality of steel flex rings 38 alternating with, and separated by, elastomeric flex rings 40. Both the steel flex rings 38 and the elastomeric flex rings 40 are formed in a "dished" or arcuate configuration, defined by a common radius of curvature, as are the bottom surface of the top bearing ring 34 and the top surface of the bottom support ring 36. The steel rings 38, the elastomeric rings 40, the top bearing ring 34, and the bottom support ring 38 are bonded together by well-known techniques. The flex elements 38, 40 are enclosed within an elastomeric outer sleeve 41, preferably about 1-2 cm in thickness, that is fixed between the top bearing ring 34 and the bottom support ring 36.

Figure 5:
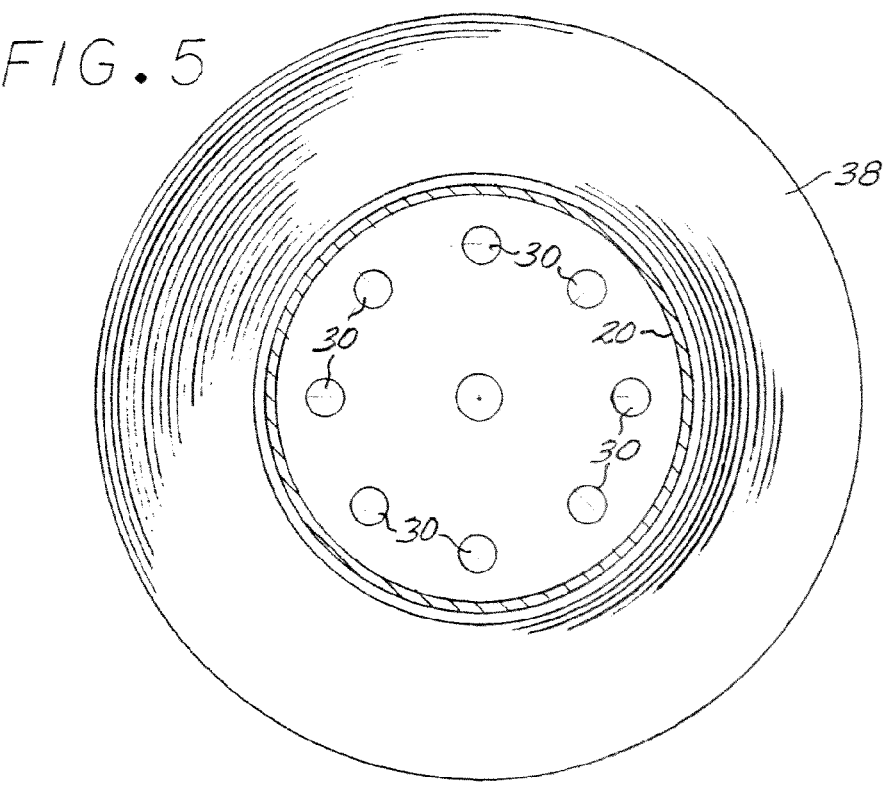
FIG. 5 is a cross-sectional view taken along line 5-5 of FIG. 4.
Figure 6:
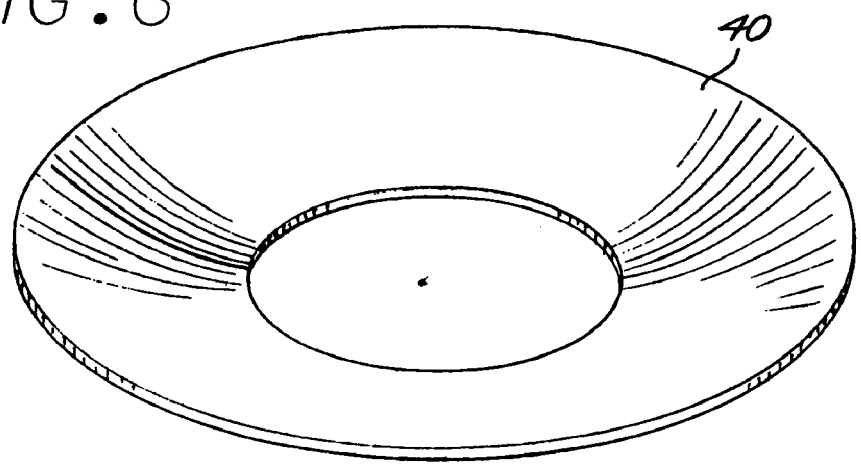
FIG. 6 is top perspective view of an elastomeric element of the hull/caisson interface connection assembly of FIG. 4.

The configuration of one of the steel flex rings 38 is illustrated in FIG. 5, which also shows the interior of the caisson 20 and the risers 30 passing through it. The configuration of one of the elastomeric flex rings 40 is shown in FIG. 6. The elastomeric flex rings 40 are preferably made of a nitrile copolymer of butadiene and acrylonitrile, marketed under the tradename "BUNA-N." Other suitable elastomeric materials include copolymers of tetrafluoroethylene marketed by DuPont Performance Elastomers under the trademark "VITON®", and by Seals Eastern, Inc. under the trademark "AFLAS®." Other suitable elastomeric materials will suggest themselves to those of ordinary skill in the pertinent arts. The particular elastomer selected will depend on the environmental conditions to be encountered and the physical characteristics desired in the bearing assembly 22. Thus, the elastomeric material may be selected for its specific physical characteristics, such as hardness and shear modulus. Likewise, the physical dimensions of the flex elements 38, 40 will be selected depending on the specific application and environment.

Although the flex elements 38, 40 are shown, in this first exemplary embodiment, as being continuous annular elements, they may be configured as a plurality of discrete cylindrical flex element stacks disposed in an annular arrangement, as discussed below in connection with the embodiment shown in FIGS. 8 and 9.

From FIG. 4 it can be seen that the inside diameter of each successive flex element 38, 40 (going from the upper end of the bearing assembly 22 to the lower end thereof) is slightly greater than the inside diameter of the flex element 38 or 40 immediately above it, thereby resulting in the diameter of the central passage 23 of the bearing assembly 22 increasing from the top of the bearing assembly 22 to the bottom thereof. This tapered configuration of the central passage 23 facilitates the relative angular motion between the caisson 20 and the receptacle, which is affixed to the hull 12, and which supports the bearing assembly 22, as mentioned above.

In a preferred embodiment of the invention, there are preferably about ten to about thirty each of the steel rings 38 and the elastomeric rings 40, vulcanized and bonded together (and to the upper bearing ring 34 and the lower support ring 36) by any suitable means known in the art to form a laminated structure in which the flex elements 38, 40 flex together, instead of sliding, in response to angular motions of the caisson 20 relative to the hull. By thus flexing, instead of sliding, the flex elements 38, 40 avoid the so-called "slip-stick" effect, in which relative motion between the caisson 20 and the hull 12 would only occur only when the static friction forces between adjacent flex elements are overcome by the angular flexing and bending loads to which the caisson 18 and the hull 12 are subject. This "slip-stick" effect would thus cause a "jerking" action, inducing erratic bending moments in the caisson, with a resultant reduction in the fatigue life of the hull/caisson interface. By eliminating this "slip-stick" effect, the bearing assembly 22, with its laminated flex elements 38, 40, starts to flex with any flex-inducing load applied to the caisson 20 and/or the hull 12, instead of requiring a load that exceeds the friction forces between unbonded flex elements. Thus, the laminated (bonded) flex element arrangement in the bearing assembly 22 substantially eliminates erratic bending moments.

The upper end of the caisson 20 may advantageously include a stress joint portion 42 where the caisson 20 joins the shoulder 32. The stress joint portion 42 is formed with a tapered wall thickness that gradually increases as it approaches the shoulder 32 along a radiused juncture 44. This feature provides an improved distribution of stress within a bending tubular member, such as the caisson 20.

Figure 7:
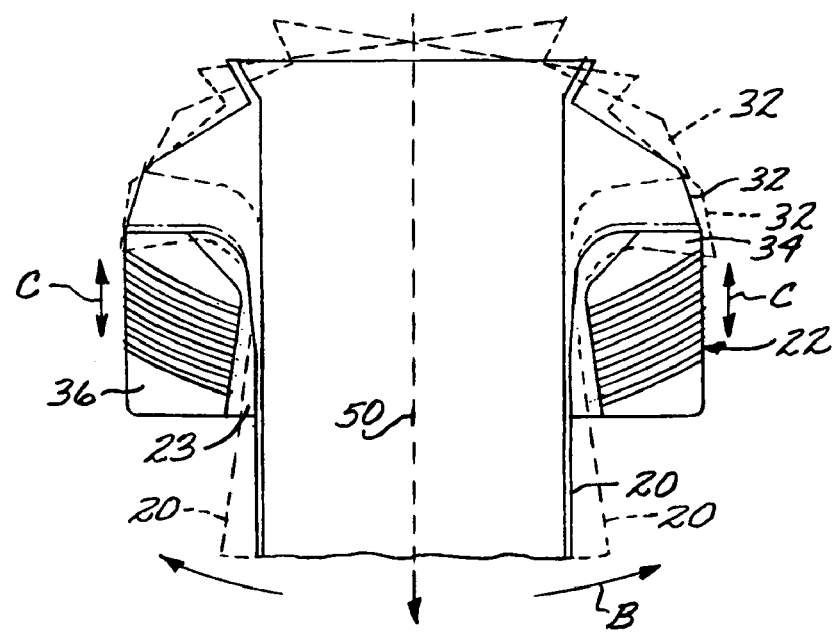
FIG. 7 is a semi-schematic cross-sectional view of the hull/caisson interface connection assembly of FIG. 4, showing the relative flexing motion between the hull and the caisson facilitated by the present invention.

The function of the hull/caisson interface connection assembly of the present invention is illustrated in FIG. 7. As mentioned above, the interface connection assembly comprises the shoulder 32 at the top end of the caisson 20 and the bearing assembly 22. As the caisson 20 is subject to an angular flexing load, indicated by the arrow "B", the caisson 20 pivots relative to a vertical axis 50, bringing the caisson shoulder 32 to bear against the bearing assembly 22, which flexes in response to the loads applied thereto by the shoulder, as indicated by the arrow "C", to accommodate these loads. The tapered internal diameter of the bearing element central passage 23 provides the leeway for the pivoting action of the caisson 22. Tensile loads along the axis 50, indicated by the arrow "A" in FIG. 1, are likewise absorbed by the bearing assembly 22.

Figure 8:
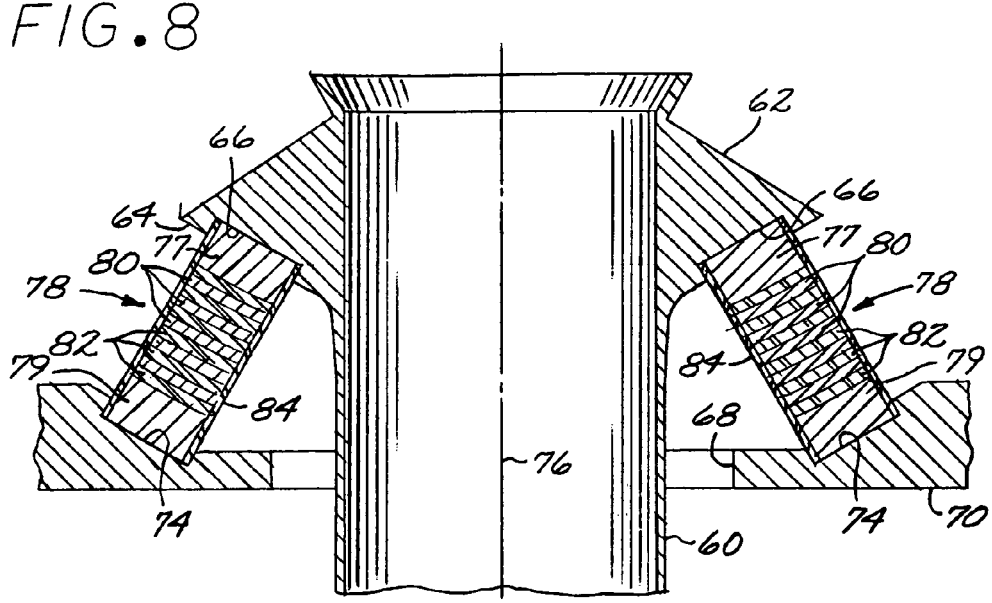
FIG. 8 is a longitudinal cross-section view of a hull/caisson interface connection assembly according to a second preferred embodiment of the present invention.
Figure 9:
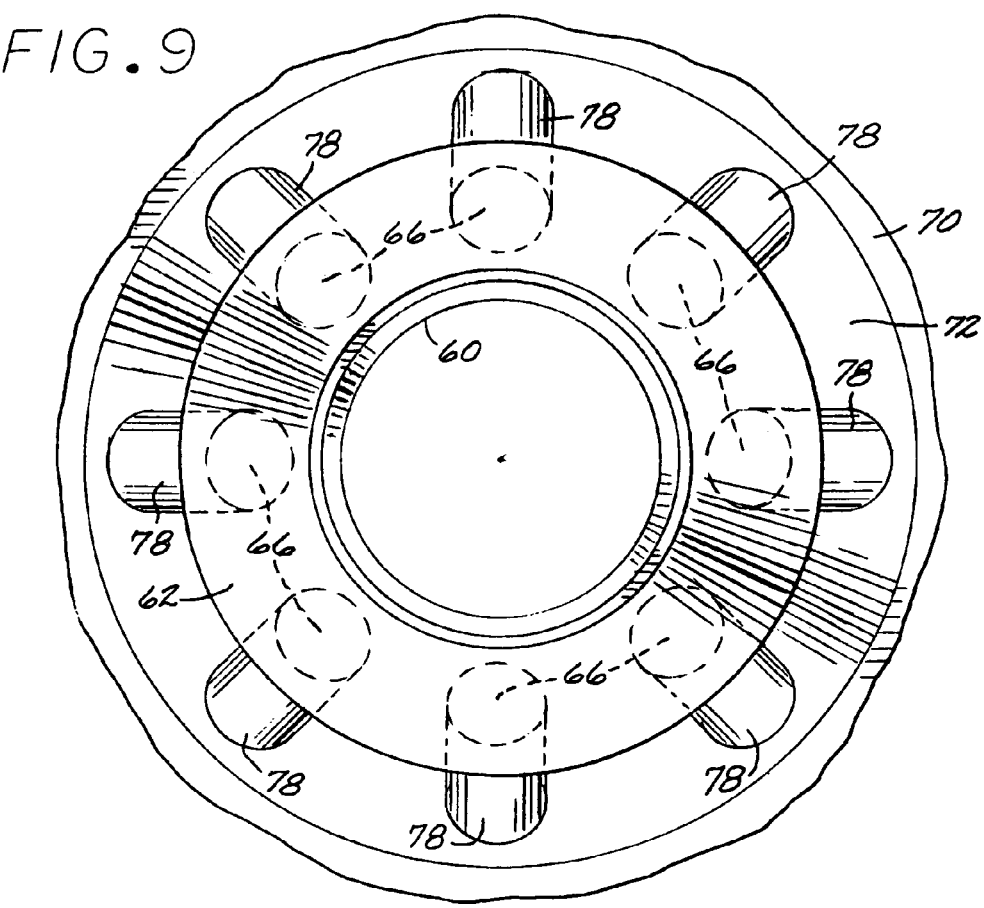
FIG. 9 is a top plan view of the hull/caisson interface connection of FIG. 8

A hull/caisson interface connection assembly, in accordance with a second preferred embodiment of the invention, is illustrated in FIGS. 8 and 9. In this embodiment, a caisson 60 includes an annular shoulder 62 extending radially from the caisson 60 near the upper end thereof. The shoulder 62 includes a sloped or angled lower surface 64 that is provided with a plurality of upper sockets 66 that are equidistantly spaced in an annular arrangement. The upper end of the caisson 60 passes through a central opening 68 in an annular receptacle 70 mounted in the open bottom end of the hull 12. The receptacle 70 includes a sloped or angled support surface 72 having a plurality of lower sockets 74, each of which is circumferentially located so as to correspond with one of the upper sockets 66. The lower sockets 74 are at a greater radial distance from a caisson central axis 76 than are the upper sockets 66.

A bearing assembly, comprising a plurality of substantially cylindrical flex element stacks or blocks 78, is mounted between the lower surface 64 of the caisson shoulder 62 and the support surface 72 of the receptacle 70, so as to surround coaxially the upper portion of the caisson 60 that is above the receptacle 70. Specifically, each of the flex element stacks or blocks 78 has a steel top bearing element 77 that is seated in one of the upper sockets 66, and a steel bottom support element 79 that is seated in a corresponding one of the lower sockets 74, so that the stacks or blocks 78 are arranged around the periphery of the caisson 60 and extend radially outward therefrom, much like spokes on a wheel, as best shown in FIG. 9.

As shown in FIG. 8, each of the flex element stacks or blocks 78 includes, between the top bearing element 77 and the bottom support element 79, a laminated structure comprising a plurality of disc—like steel flex elements 80 alternating with a plurality of similarly-shaped elastomeric flex elements 82. The flex elements 80, 82 may advantageously be concave or dish-shaped, when viewed from the top, with a common radius of curvature, thereby resembling small versions of the flex rings 38, 40 that are used in the above-described first embodiment, but without a central aperture. The flex elements 80, 82 may be made of materials that are the same as, or similar to, the annular flex elements 38, 40 of the above-described first embodiment, and they are vulcanized and bonded together by any suitable means, as discussed above in connection with the first embodiment. Each of the flex element stacks or blocks 78 is encased in an elastomeric sleeve 84, which is similar to the sleeve 41 described above in connection with the first embodiment.

Each of the flex element stacks or blocks 78 flexes as a unit, as does the above-described arrangement of annular flex element rings 38, 40 in the first embodiment. Furthermore, the above-described advantages of the first embodiment are also achieved in this second embodiment. Although eight flex element stacks or blocks 78 are shown in the illustrated embodiment, the number of the stacks or blocks 78, their specific physical dimensions, and the number of individual flex elements 80, 82 forming each stack or block 78, will vary according to the specific needs and demands of the Spar structure in which they are employed. One advantage of this second embodiment is that the use of multiple flex element stacks or blocks removes constraints on the size of the individual flex elements.

Although an exemplary embodiment of the invention has been described above by way of example only, it will be understood by those skilled in the field that modifications may be made to the disclosed embodiment without departing from the scope of the invention, which is defined by the claims that follow.

What is claimed is:

1. A hull-to-caisson interface connection assembly for connecting a platform hull and a caisson extending downwardly from an upper portion coupled to the bottom of the hull, the caisson defining vertical axis and having a top end located within the hull, the assembly comprising:
   a shoulder fixed to and extending radially from the top end of the caisson; and
   a bearing assembly disposed coaxially around the upper portion of the caisson below the shoulder, the bearing assembly comprising:
   a steel top bearing ring forming the uppermost part of the bearing assembly, against which the shoulder is seated, the top bearing ring having a bottom surface with a defined axis of curvature;
   a steel bottom support ring forming the lowermost part of the bearing assembly, the bottom support ring having a top surface with the defined axis of curvature; and
   a laminated structure of alternating steel and elastomeric flex rings, disposed between the top bearing ring and the bottom support ring, the steel and elastomeric flex rings being configured with the defined axis of curvature, each successive flex ring having an inside diameter slightly greater than the inside diameter of the flex ring immediately above it, thereby defining a central passage of the bearing assembly having a diameter that increases from the top bearing ring to the bottom bearing ring so as to permit the caisson to pivot relative to the vertical axis in response to an angular flexing load applied to the caisson, the flex rings being bonded to each other to flex together as a unit substantially without sliding between adjacent flex rings in response to loads applied to the top bearing ring by the shoulder when the caisson pivots relative to the vertical axis.

2. The assembly of claim 1, wherein the steel and elastomeric flex rings are vulcanized and bonded together.

3. The assembly of claim 1, wherein the bottom support ring is configured to be mounted in a receptacle fixed in the bottom of the hull.

4. The assembly of claim 1, wherein all of the flex rings have a dished configuration with a common radius of curvature.

5. The assembly of claim 1, wherein the top bearing ring has a bottom surface, and the bottom support ring has a top surface, and wherein the flex rings, the bottom surface of the top bearing ring, and the top surface of the bottom support ring have a common radius of curvature.

* * * * *